US009715528B2

(12) United States Patent
Ho et al.

(10) Patent No.: US 9,715,528 B2
(45) Date of Patent: Jul. 25, 2017

(54) REAL-TIME DATA REDACTION IN A DATABASE MANAGEMENT SYSTEM

(71) Applicant: Oracle International Corporation, Redwood Shores, CA (US)

(72) Inventors: Min-Hank Ho, Newark, CA (US); Javed Samuel, Hayward, CA (US); Peter Knaggs, San Mateo, CA (US); Dah-Yoh Lim, Belmont, CA (US); Paul Youn, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/312,578

(22) Filed: Jun. 23, 2014

(65) Prior Publication Data

US 2014/0304298 A1    Oct. 9, 2014

Related U.S. Application Data

(63) Continuation of application No. 13/309,466, filed on Dec. 1, 2011, now Pat. No. 8,762,406.

(51) Int. Cl.
*G06F 17/30* (2006.01)

(52) U.S. Cl.
CPC .. *G06F 17/30498* (2013.01); *G06F 17/30554* (2013.01)

(58) Field of Classification Search
CPC ......... G06F 17/30498; G06F 17/30554; G06F 7/764
USPC .......................................................... 707/769
See application file for complete search history.

(56) References Cited

U.S. PATENT DOCUMENTS

| 6,061,448 | A | 5/2000 | Smith et al. |
| 6,971,022 | B1 | 11/2005 | Katta et al. |
| 7,010,681 | B1 | 3/2006 | Fletcher et al. |
| 7,310,647 | B2* | 12/2007 | Lei .................... G06F 17/30427 |
| 7,475,242 | B2 | 1/2009 | Baird et al. |
| 7,620,821 | B1 | 11/2009 | Grohoski et al. |
| 7,748,027 | B2* | 6/2010 | Patrick .................... G06F 21/62 709/224 |
| 7,774,485 | B2 | 8/2010 | Patrick et al. |
| 7,827,403 | B2 | 11/2010 | Wong et al. |

(Continued)

OTHER PUBLICATIONS

U.S. Appl. No. 13/288,909, filed Nov. 3, 2011, Advisory Action, Jun. 26, 2014.

(Continued)

*Primary Examiner* — Thanh-Ha Dang
(74) *Attorney, Agent, or Firm* — Hickman Palermo Becker Bingham LLP

(57) ABSTRACT

A database server receives a data request from a client. In response to the data request, the database server selects, from a database, actual data that satisfies criteria specified by the data request. The database server retrieves the selected actual data from the database. Also in response to the data request, the database server redacts the retrieved data in real time without modifying the actual data contained within the database. This may be accomplished by the prior insertion of masking operators into a top SELECT clause of a query representation generated during semantic analysis. The database server returns the redacted data to the client as a reply to the data request.

10 Claims, 3 Drawing Sheets

(56) References Cited

U.S. PATENT DOCUMENTS

| | | | |
|---|---|---|---|
| 8,055,668 B2 * | 11/2011 | Pomroy | G06F 21/6227 707/756 |
| 2002/0095405 A1 * | 7/2002 | Fujiwara | G06F 17/30451 |
| 2005/0166260 A1 | 7/2005 | Betts et al. | |
| 2006/0075228 A1 | 4/2006 | Black et al. | |
| 2006/0259614 A1 * | 11/2006 | Patrick | G06Q 10/10 709/224 |
| 2007/0094594 A1 * | 4/2007 | Matichuk | G06F 17/274 715/205 |
| 2007/0195779 A1 | 8/2007 | Judge et al. | |
| 2007/0219951 A1 * | 9/2007 | Ahmed | G06F 17/30466 |
| 2007/0219969 A1 * | 9/2007 | Su | G06F 17/30466 |
| 2007/0300306 A1 | 12/2007 | Hussain | |
| 2008/0046757 A1 * | 2/2008 | Staddon | H04L 9/088 713/189 |
| 2008/0184336 A1 | 7/2008 | Sarukkai et al. | |
| 2008/0235760 A1 | 9/2008 | Broussard et al. | |
| 2008/0291855 A1 * | 11/2008 | Bata | H04W 84/18 370/311 |
| 2009/0006447 A1 * | 1/2009 | Balmin | G06F 17/30938 |
| 2009/0019379 A1 * | 1/2009 | Pendergast | G06F 17/30011 715/762 |
| 2009/0025063 A1 * | 1/2009 | Thomas | G06F 21/6218 726/4 |
| 2009/0064271 A1 | 3/2009 | Ng et al. | |
| 2009/0116643 A1 | 5/2009 | Hatano et al. | |
| 2009/0171649 A1 | 7/2009 | Kishore et al. | |
| 2009/0299989 A1 * | 12/2009 | Zhang | G06F 17/30469 |
| 2009/0320093 A1 | 12/2009 | Glazier et al. | |
| 2010/0005306 A1 * | 1/2010 | Izu | G06F 21/64 713/176 |
| 2010/0030798 A1 | 2/2010 | Kumar et al. | |
| 2010/0070396 A1 * | 3/2010 | Schrichte | G06Q 10/00 705/34 |
| 2010/0131551 A1 * | 5/2010 | Benzaken | G06F 21/6245 707/769 |
| 2010/0229246 A1 * | 9/2010 | Warrington | G06F 21/6218 726/28 |
| 2011/0239113 A1 * | 9/2011 | Hung | G06F 19/322 715/271 |
| 2011/0247081 A1 * | 10/2011 | Shelton | G06F 21/6218 726/28 |
| 2011/0265177 A1 * | 10/2011 | Sokolan | G06F 21/6227 726/19 |
| 2012/0028659 A1 * | 2/2012 | Whitney | H04M 1/72547 455/466 |
| 2012/0159296 A1 * | 6/2012 | Rebstock | G06Q 10/00 715/205 |
| 2012/0323975 A1 | 12/2012 | Ingole et al. | |
| 2013/0086088 A1 * | 4/2013 | Alton | G06F 17/30477 707/754 |
| 2013/0117313 A1 | 5/2013 | Miao et al. | |
| 2013/0117802 A1 * | 5/2013 | Fendt | G06F 21/6218 726/1 |
| 2013/0144901 A1 | 6/2013 | Ho et al. | |
| 2013/0238603 A1 | 9/2013 | Sokolan et al. | |

OTHER PUBLICATIONS

U.S. Appl. No. 13/288,909, filed Nov. 3, 2011, Final Office Action, Jan. 21, 2015.

U.S. Appl. No. 13/309,466, filed Dec. 1, 2011, Notice of Allowance, Feb. 11, 2014.

U.S. Appl. No. 13/288,909, filed Nov. 3, 2011, Office Action, Oct. 1, 2013.

U.S. Appl. No. 13/309,466, filed Dec. 1, 2011, Office Action, Jul. 17, 2013.

U.S. Appl. No. 13/288,909, filed Nov. 3, 2011, Office Aciton, Apr. 11, 2013.

U.S. Appl. No. 13/288,909, filed Nov. 3, 2011, Final Office Action, Mar. 19, 2014.

U.S. Appl. No. 13/288,909, filed Nov. 3, 2011, Office Action, Aug. 26, 2014.

* cited by examiner

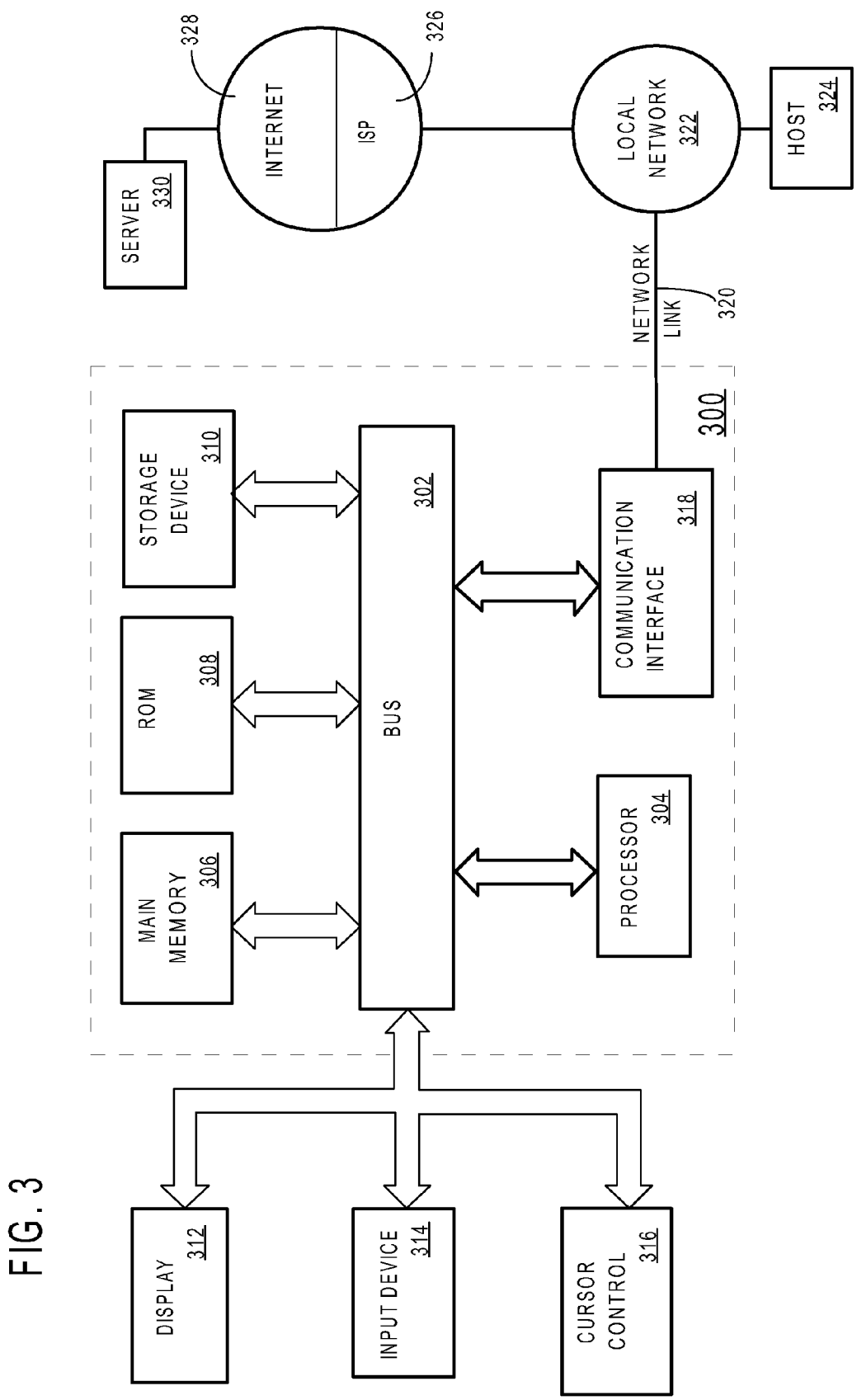

REAL-TIME DATA REDACTION IN A DATABASE MANAGEMENT SYSTEM

RELATED APPLICATIONS

The present application is a continuation of U.S. application Ser. No. 13/309,466, filed Dec. 1, 2011, titled Real-Time Data Redaction In A Database Management System, and naming as inventors Min-Hank Ho, et al., the contents of which are incorporated by reference.

The present application is related to U.S. application Ser. No. 10/247,323, filed Sep. 18, 2002, titled Database Fine-Grained Access Control, and naming as inventors Chon Hei Lei and Douglas James McMahon, which is continuation of U.S. application Ser. No. 09/167,092, filed Oct. 5, 1998, titled Database Fine-Grained Access Control, and naming as inventors Chon Hei Lei and Douglas James McMahon. The present application is also related to U.S. application Ser. No. 09/589,602, filed Jun. 7, 2000, titled Partitioned Access Control To A Database, and naming as inventors Daniel ManHung Wong, Chon Hei Lei, which is a continuation-in-part of U.S. application Ser. No. 09/872,896, filed May 31, 2001, titled Virtually Partitioning User Data In A Database System, and naming as inventors Christine Pae Guthrie, Jesper Andersen, Chon Hei Lei and Douglas James McMahon. The present application is also related to U.S. Pat. No. 7,310,647, filed Jan. 23, 2004, titled Column Masking of Tables, and naming as inventors Daniel Manhung Wong, Thomas Keefe, and Kristy Browder Edwards. The present application is also related to U.S. Pat. No. 7,827,403, filed Apr. 13, 2005, titled Method and Apparatus for Encrypting and Decrypting Data in a Database Table, and naming as inventors Daniel Manhung Wong and Chon Hei Lei. All of the above patents and applications and their respective continuations-in-part are hereby incorporated in their entirety herein by reference.

FIELD OF THE INVENTION

The invention relates to computer security in general. More specifically, the invention relates to redacting data retrieved from database tables while leaving the data in the tables unchanged.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, whether or not a given approach is prior art, the problems identified with that approach should not be assumed to have been recognized in the prior art.

A database server stores data in one or more data containers. Each container contains records. The data within each record is organized into one or more fields. In a database system that stores data in a relational database, the data containers are referred to as tables, the records are referred to as rows, and the attributes are referred to as columns. In object oriented databases, the data containers are referred to as object classes, the records are referred to as objects, and the attributes are referred to as object attributes. Other database architectures may use other terminology.

The description herein is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A database server retrieves and manipulates data in response to receiving a database statement. Typically the database statement conforms to a database language, such as Structured Query Language (SQL). A database statement can specify a query operation, a data manipulation operation, or a combination thereof. A database statement that specifies a query operation is referred to herein as a query. The discussion herein is not limited to database statements that specify a particular type of operation. However, for the purpose of explanation, examples discussed herein are illustrated using queries.

One function of a database server is to control access to database data. Security mechanisms on database servers control what data may be accessed by a query issued by a user. One type of security mechanism is referred as a fine-grained access control mechanism. An example of fine-grained access control is described in U.S. Pat. No. 6,487,552, issued Nov. 26, 2002 to Chon Hei Lei et al, which is incorporated herein by reference in its entirety. Fine-grained access control may be used to grant and/or deny access to one or more rows of a table.

Legal and industry compliance requirements are forcing companies to mask or redact security sensitive data that are displayed to both authorized and unauthorized users on production systems. A common example of this masking can be seen on a credit card receipt where all but the last four digits of the credit card number are replaced with the X character.

Data redaction solutions mask out data dynamically and/or persistently. Dynamic data masking techniques redact data in the application level, on the network, or through views and triggers in the database. Persistent data masking techniques create a redacted copy of the data that may reside on the same database as the original data or may be exported to a separate test or development database where none of the original data exists. These approaches have several drawbacks.

Persistent masking techniques require modification of the original data and/or creation of new persistent database objects. Any masking technique that directly modifies the original data cannot be used on production databases where the integrity of the original data must be maintained. Some have attempted to work around this problem by creating shadow tables (i.e., duplicate tables) that store the redacted versions of the original data. This forces applications to modify their queries to select from the shadow tables. Doing so incurs additional time and development expense. Furthermore, each application needs to implement its own logic to decide whether to query from a redacted table or the original table Techniques that redact at the application level can produce inconsistent redaction behavior across different applications. Companies use a variety of applications provided by multiple vendors with multiple development teams. As a result, the data that are redacted and the method used to redact the data can vary greatly across applications. In some cases, the results may not fully address customer compliance needs because the application failed to mask or redact data in a manner required for a given industry or region.

Some applications may be designed without masking or redaction capabilities. Many applications designed before current data privacy compliance requirements do not incorporate data masking or redaction capabilities for all required data. The cost to modify these applications to support masking can be prohibitive as it may involve significant changes to the application architecture.

Persistently redacted data and data redaction performed through views and triggers in the database may produce incorrect relational processing. When data is redacted too early, basic relational operations like JOINs will operate on data after it has been masked or redacted. This happens when redaction is implemented through triggers or if data is persistently redacted. In permanently redacted databases, redacted values are required to have a one-to-one mapping with the original values so that data relationships can be preserved. This approach is not only slow and difficult to implement in a reliable way, but it also creates redacted data that is reversible, which is an undesirable property in data redaction in a production environment.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a block diagram that illustrates a computer system upon which an embodiment of the invention may be implemented.

DETAILED DESCRIPTION OF THE INVENTION

Figure 1:
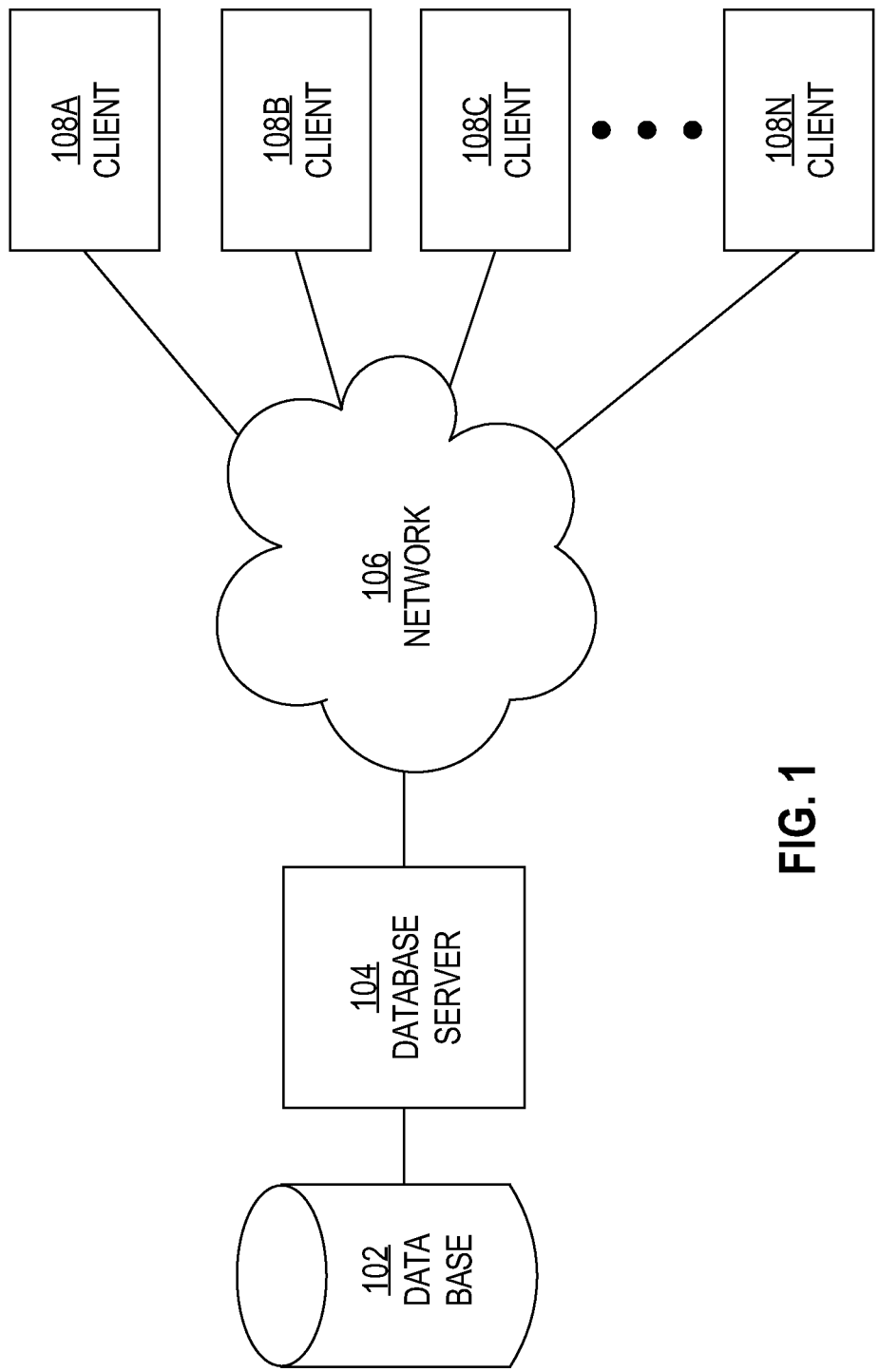
FIG. 1 illustrates an example of a database system in which real-time data redaction may be performed, according to an embodiment of the invention.

A method and apparatus for real-time redaction of data retrieved from a database is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature may not address any of the problems discussed above or may only address one of the problems discussed above. Some of the problems discussed above may not be fully addressed by any of the features described herein. Although headings are provided, information related to a particular heading, but not found in the section having that heading, may also be found elsewhere in the specification.

OVERVIEW

Real-time data redaction dynamically redacts sensitive data stored in a database by modifying the results of a query just before those results are returned to the issuer of the query (e.g., a user). The decision is redact is driven by policies that define what to redact (e.g., which tables and columns), when to redact, and how to redact. Embodiments of the invention contain several novel features that allow them to improve upon the capabilities of prior approaches. Real-time data redaction can redact data inside the database without persistently altering the data or creating a persistent version of redacted data. Data to be redacted can be identified by the columns they belong to inside a relational database. Policies for redaction behavior can be specified in the same database where the data resides, allowing the redaction behavior to be consistent across all database clients. The database can return original data or redacted data based on simple expressions, defined in the redaction policy, such that a highly privileged user can see original data while a low privileged user can only see redacted data. These expressions can be driven by database roles, application roles (through an application context value), client Internet Protocol addresses, etc. Redaction policies can be enabled or disabled real time with a single command to the database. Real-time data redaction can draw upon all data available within the database to perform redaction. For example, a string to be redacted can be replaced with another value in the database that resides in a different table. The database server may also choose to show redacted or original data based on whether the server is acting in context of a production database or a standby database. Real-time data redaction can complement existing database authorization capabilities rather than provide an orthogonal authorization framework.

Beneficially, embodiments of the invention allow information indicating when and how data should be redacted to be specified once, and then applied everywhere. In contrast to embodiment of the invention, application-level redaction solutions only solve the problem for the specific application. Techniques described herein apply to all clients of the database (e.g., applications, reporting tools, administration interfaces, etc.). The redaction policy is stored with the data and can be exported with the data to another database. So, redaction behavior remains consistent in the enterprise.

Advantageously, embodiments of the invention perform data redaction dynamically, meaning that the original data is not modified, thereby allowing the original data to be used in production databases. Also, storage of a redacted copy of the data is made unnecessary, reducing storage requirements.

Beneficially, embodiments of the invention allow the specification at a columnar level of which data to redact. In most cases, this is the ideal granularity to identify a class of data to redact. Typical examples are credit card numbers or social security numbers. Most applications store these values within a column in a database table. Using real-time data redaction, it is possible to mark those columns as needing redaction, prompting the database server to take care of the actual redaction. In contrast to embodiments of the invention, in-line network masking solutions need to use either regular expression pattern matching or Structured Query Language (SQL) semantic analysis to know whether a given value should be masked; failures of those network masking solutions may cause data that should have been redacted not to be redacted, or may cause data that should not have been redacted to be redacted.

Advantageously, embodiments of the invention allow all redaction policies for a given set of data to be easily viewed, tracked, and managed within the database in which the data resides. In contrast to embodiment of the invention, application-level and in-line network solutions cannot easily provide a full picture of whether a given data item will always be redacted.

Example System

FIG. 1 illustrates an example of a database system in which real-time data redaction may be performed, according to an embodiment of the invention. System 100 includes a database 102, a database server 104, network 106, and database clients 108A-N. Database clients 108A-N are connected to network 106 and issue data requests, such as SQL queries, to database server 104 via network 106. In response receiving such data requests over network 106, database server 104 selects, from database 102, actual data that satisfy criteria specified by the data requests. Also in response to such data requests, database server 104 redacts at least portions of that selected data in real-time upon determining that those portions should be redacted, without modifying the original actual data contained within database 102. Database server 104 then sends the resulting at-least-partially redacted data back to database clients 108A-N as a reply to the corresponding data requests for that data. Upon receiving the redacted data, database clients 108A-N may store and/or present, to users, the received data, at least part of which is redacted. Due to the redaction, users are unable to comprehend any redacted portion of the presented data. Clients 108A-N do not need to perform any redaction, as the redaction has already been performed by database server 104.

In one embodiment, whether redaction is performed by database server 104, and the kind of redaction performed by database server 104, depends on the identity of the one of clients 108A-N from which the data request is received. For example, database server 104 may perform redaction on data only in response to data requests received from clients having IP addresses that are contained within a specified list of IP addresses. For another example, database server 104 may redact data using a technique that is mapped to the IP address of the client from which database server 104 received the data request. Different clients' IP addresses may be mapped to different redaction techniques. Additionally or alternatively, different user identities may be mapped to different redaction techniques, causing the data returned to some users to be redacted differently than data returned to other users.

In one embodiment, stored redaction policies indicate identities of clients for which data is to be redacted, and the type of redaction that is to be performed on data that will be returned in reply to those clients' data requests. In one embodiment, these stored redaction policies are stored along with the data to be redacted itself, within database 102. In such an embodiment, when the data within database 102 are exported to another destination, the stored redaction policies are exported along with that data. Both the data and the stored redaction policies may be stored within relational tables within database 102.

In one embodiment, each redaction policy indicates one or more columns of one or more database relational database tables that are to be redacted. In such an embodiment, when database server 104 redacts data retrieved from database 102, database server 104 redacts only the data that was retrieved from the to-be-redacted columns identified by the redaction policy being applied; data retrieved from other columns may be returned to the requesting client in its original, actual form. Thus, a reply to a client may contain some redacted data and some actual data.

Establishing Redaction Policies

As is discussed above, in one embodiment, the redaction policies are stored along with the actual data itself within database 102. In one embodiment, a redaction policy is initially established within database 102 by invoking a Procedural Language/Structured Query Language (PL/SQL) package. This PL/SQL package includes a variety of interfaces through which specified redaction policies may be added to, modified within, or removed from database 102. Some interfaces of the PL/SQL package may permit specified columns of specified relational tables to be added to or removed from specified redaction policies. Interaction with these interfaces causes policy-specifying rows to be added to the data dictionary of database 102. Thus, although the discussion above refers to the storage of the redaction policies along with the data upon which redaction may be performed, in one embodiment, the redaction policies are actually stored within the data dictionary, while the data upon which the redaction may be performed are stored in relational tables.

In an alternative embodiment of the invention, redaction policy is created and administered using SQL rather than PL/SQL.

Universal Redaction Policy Application

As is discussed above, redaction policies are applied by database server 104 rather than any of clients 108A-N. Because database server 104 redacts the data to be returned to clients 108A-N, application of the redaction policies is universal; unless redaction policies specifically indicate that different redaction policies are to be applied depending on client identity, data will be redacted in a similar manner for all clients regardless of the kind of application that client is. Clients therefore do not need to be redaction-aware, and there is no risk that data which should have been redacted will be unintentionally sent in actual form to a client that has not been designed to perform redaction.

Redaction policies may be analogized to filters, where each policy may define a different filter shape. Any query-selected actual data that matches the filter's shape will be redacted when it passes through the filter, while any query-selected actual data that does not match the filter's shape will flow on to the client in its original actual form. Furthermore the filter shape may be based on the current context or environment and change dynamically as the context and environment changes. For example, a policy can be defined to allow data to flow through unredacted only during business hours and redact data for all other times.

As is mentioned above, data redaction is performed by database server 104 before database server 104 sends any data back across network 106 to clients 108A-N. Thus, embodiments discussed herein may be distinguished from and contrasted with alternative approaches in which some database-external process intercepts data that a database server already retrieved and sent over a network, detects patterns therein, and applies redaction upon the intercepted data that matches certain patterns.

Filter Conditions

Any information available to database server 104 may be used as a condition in a redaction policy's filter. For example, a redaction policy might be applied only to clients having certain specified IP addresses, or to all clients except those having certain specified IP addresses. For another example, a redaction policy might be applied only to users having certain specified user identities, or to all users except those having certain specified user identities.

Redaction Planning During Semantic Analysis

In one embodiment, when database server 104 receives a SQL query from one of clients 108A-N, database server 104 performs semantic analysis upon the query. In performing semantic analysis upon the query, database server 104 generates an internal representation of the query. After this internal representation of the query has been generated, internal database semantic analysis code within database server 104 determines where, within the internal representation, specified "mask operators" are to be placed. More specifically, the internal database semantic analysis code makes this determination for each relational column that has a masking policy associated therewith. Thus, the internal representation of the query is modified to include the mask operators "around" policy-specified columns in the query.

Later, when database server 104 executes the modified internal representation of the query, these mask operators are executed. Each such mask operator receives the actual data read from the column with which that mask operator has been associated in the internal representation. Each such mask operator redacts that data from its associated column and outputs the redacted data instead of the original data that the mask operation received. Thus, in one embodiment, the modules of database that select and retrieve data from the relational tables are unchanged by the redaction techniques disclosed herein; the internal representation of the query itself is changed prior to the query's execution so that redaction will occur when the query is actually executed.

In one embodiment, whenever a redaction policy is initially established in database 102, the redaction policy is analyzed to determine all of the columns to which the redaction policy potentially applies. In such an embodiment, each column to which a redaction policy applies has a bit or flag associated with that column responsively set to "true" to indicate that some redaction policy applies to that column. Consequently, the insertion of the masking operators into the internal representation of the query during semantic analysis is quickened, since the internal database semantic analysis code can quickly determine, by reference to the value of each column's associated bit or flag, whether the internal database semantic analysis code needs to search for redaction policies that could cause the internal database semantic analysis code to insert one or more masking operators for that particular column; columns whose associated bit or flag has not been set are known not to need any masking operators.

In one embodiment, semantic analysis, with its insertion of masking operators as discussed above, occurs prior to the performance of any JOIN operations specified in the query. For this reason, care is taken during the insertion of masking operators not to do anything that would alter the subsequent conduct of any JOIN operations. In one embodiment, masking operators are inserted into the top SELECT clause of the SQL query (and, in at least one embodiment of the invention, only into the top SELECT clause); in at least one embodiment of the invention, no masking operators are inserted into any WHERE clauses. This technique may be contrasted, for example, with approaches that encrypt data within certain columns by modifying every instance of that column's reference within the query so that the data contained within that column is redacted; the later approach detrimentally prevents subsequent JOIN operations from being performed correctly, since the encrypted data that would have caused two rows to be joined would no longer match after being encrypted. In one embodiment, masking operators are only inserted into the top-level SELECT clause, even if the query contains nested SELECT clauses.

Policy Scope

In one embodiment, each redaction policy is associated with a specified relational table or view (e.g., a materialized view), such that the redaction policy is applied only to data retrieved from that table or view and no other table or view. However, in an alternative embodiment, each redaction policy may specify an associated scope that may be larger than a single table or view. For example, in one embodiment, a redaction policy may specify that the policy is applicable to all data that conforms to a specified database schema, or that the policy is applicable to all data that is contained within the database. Policies may be applicable to database objects of all kinds rather than just specific tables or views.

A policy's scope may be expressed in a variety of ways other than container names also. For example, in one embodiment, a policy's scope may be based on timing information, such that the policy is applicable only to data that was stored in the database during a time within a specified range of times having a defined starting and ending time. For another example, in one embodiment, a policy's scope may be based on information contained within the data upon which redaction is to be applied. For example, in one embodiment, a policy may specify that redaction is only to be performed on all table rows in which a specified column's value is the same as, or is greater than, or is less than, a specified value. For another example, a policy may specify that redaction is only to be performed on all table rows in which a specified column's value at least partially matches a specified pattern, which might be specified as a regular expression. Such redaction may be applied to values in columns other than the specified column, of course. In other embodiments, policies may specify that redaction is only to be performed on all table rows in which a combination of two or more column's values satisfy some specified criteria (such as, for example, the kinds of criteria discussed above). For example, if a particular table's columns include columns for age and department number, then a policy may specify that it is applicable only to table rows in which both (a) the value of the age column is greater than a certain number and (b) the value of the department number is contained within a specified set of department numbers.

Policies may be defined for multiple databases on an external policy server. The database can contact the external policy server to retrieve the applicable policies needed to determine whether to redact the data. Alternatively, the policies may be copied to the database server and cached locally on the database when the database starts up.

Masking Types

In one embodiment, each redaction policy specifies a type of masking that is to be performed on data in order to accomplish the redaction of that data. One type of masking is "none." When this type of masking is applied to data, the data remains unchanged. Another type of masking is "full." When the "full" masking type is applied to numeric data, the resulting redacted output is zero, regardless of the original value of the numeric data. When the "full" masking type is applied to string data (i.e., a sequence of one or more characters), the resulting redacted output is a fixed-size string of characters that is unrelated to the original value of the string data. When the "full" masking type is applied to time or data, the resulting redacted output is a specified time or data that is unrelated to the original value off the time or date data. In one embodiment, the redaction policy may specify that the output is to be some random value rather than a fixed value; under such circumstances, the data redacted from each row may be replaced by a different random value.

Another type of masking is "partial fixed character" masking. A redaction policy using this type of masking specifies (a) a starting and/or ending character location within a string and (b) a replacement character. When redaction is performed, all of the actual data's characters starting at the starting location within the string (or the beginning of the string, if unspecified) until the ending location within the string (or the ending of the string, if unspecified) are replaced with the specified replacement character in order to accomplish the partial fixed character redaction. Characters outside of the starting and ending locations are not redacted. For example, all but the last four digits of a credit card number may be replaced by the X character.

Another type of masking is "random pick" masking. When "random pick" masking is performed on a data item, some replacement data item is randomly selected from a specified set of replacement data items, and the original data item is replaced with the randomly selected data item in the output. The randomly selected item may appear to be plausible data. For example, an address retrieved from a table row may be redacted by replacing the address with some other real or fictional address randomly selected from a replacement table of specified addresses. Performing this type of redaction is beneficial when it desired to make the fact that redaction was performed less detectable to those receiving the redacted data. For example, if the original data specifies a person's blood type, then the redaction policy may specify that the replacement data item is to be selected randomly from a set of blood types that contains all real blood types.

In one embodiment of the invention, the interfaces exposed by the PL/SQL package enable a user to specify his own custom-made redaction policy. For example, the redaction policy could be specified as a PL/SQL function. Such a redaction policy could perform a type of masking other than the types expressly discussed above. In alternative embodiments, custom-made redaction policies may be specified using languages other than PL/SQL. For example, in one embodiment, a custom-made redaction policy could be specified in the JAVA programming language. Database server 104 itself may execute the custom-made redaction policy regardless of the language in which the redaction policy is specified; in one embodiment, database server 104 includes a JAVA virtual machine (JVM) capable of executing policies specified in the JAVA programming language without invoking any JVM external to database server 104. For another example, in one embodiment, a custom-made redaction policy could be specified using the Regular Expression language. This is similar to the language used by the patterns permitted by Oracle's REGEXP_REPLACE SQL function. Use of this Regular Expression language allows the data redaction policy to be specified in a flexible yet well-recognized standards-based fashion, leading to substantial advantages such as more widespread adoption, since many people are already familiar with the Regular Expression language and its usage in other contexts.

According to one embodiment of the invention, extensions to the concept of a Regular Expression replacement string's use of back references are made. The following example illustrates these extensions and their usefulness:

It may be the case that a user wants to ensure that invoice numbers are at least partially redacted. The invoice numbers might have a structure in which a sequence of digits precedes date information. Examples of invoice numbers conforming to this structure are:

1234265.15112010_15_November_2010
9876222.16022011_16_February_2011
2989342.11122011_11_December_2011

It may be the case that the user wants to redact the date information, but in a random manner, so that the actual dates are replaced with randomly generated or randomly selected dates. After the performance of such redaction, the example invoice numbers presented above might look like this:

1234265.22032010_22_March_1987
9876222.17032011_17_March_2018
2989342.23032011_23_March_1997

Using the Regular Expression language to specify the redaction policy, the search string could be specified (ignoring month-matching for purposes of simplicity) in a form something like:

(\d\d\d\d\d\d\d).(\d\d)(\d\d)(\d\d\d\d)_\2_[:Month:]_\4

However, the replacement string could not take the form:

\1.\2\3\4_\2_March_\4

Use of such a form of a replacement string would cause the actual values that were matched to be displayed to other user—something that is sought to be avoided by the redaction. In the above replacement string, the numerals 1 through 4 are back references. Therefore, according to one embodiment of the invention, the syntax of the replacement string is extended to include the concept of random redaction (while retaining the same size). In such an embodiment, the inclusion of the letter "r" in front of a back reference numeral signifies that a random value should be substituted for the actual matching value. Using such a syntax, the replacement string could be rewritten as the following:

\1.\r2\r3\r4_\r2_March_\r4

The presence of the "r" before the 2, 3, and 4 back reference numerals will cause those values to be randomized when presented. The lack of the "r" before the 1 back reference numeral will cause the matching value from the actual data to be presented.

Mitigating Binary Search Redaction-Circumvention Schemes

Data redaction is often used in order to prevent certain users from discovering actual values (stored in the database) that are protected by data redaction policies. Unfortunately, users who are able to issue arbitrary SQL queries against the database may be capable of crafting various different WHERE clauses in an attempt to narrow down the values to the values of interest. For example, even if a redaction policy protects and redacts the "AGE" column of a relational table "HR_TABLE," a clever user could attempt to negate the protection by issuing a query such as "SELECT AGE FROM HR_TABLE WHERE NAME='SCOTT' AND AGE>=50 AND AGE<=53." Even if the database server responded to this query by replacing Scott's actual age with a random value such as 23, the user would still be able to ascertain that Scott's actual age really fell within the 50-53 range.

In one embodiment of the invention, to mitigate such redaction circumvention schemes, the database server's resource monitoring infrastructure is leveraged. In general, such binary searching-based circumvention attempts tend to be quite CPU intensive, and by placing hard limits on the amount of CPU usage, and carefully auditing (or even blocking) all queries which exceed the CPU thresholds, mitigation against these attempts is achieved. Thus, in one embodiment of the invention, a database server blocks or logs and reports the processing of queries that require more than a specified threshold level of CPU usage.

Large Object Redaction

Some columns of a relational table may store data that is of a large object type. Each such large object may be a separate document, for example. In one embodiment of the invention, a redaction policy may specify portions of such large objects that are to be redacted. For example, the redaction policy may specify a regular expression. Under such circumstances, application of the redaction policy to the large object would replace all instances of data items within the large object that matched the regular expression with some other data.

Enabling and Disabling Redaction

In one embodiment, database server 104 is configured to recognize certain PL/SQL or SQL commands that alternatively turn on or turn off all redaction. One such PL/SQL command instructs database server 104 to turn on all redaction policies. Another such PL/SQL or SQL command instructs database server 104 to turn off all redaction policies. While redaction policies are turned off in this manner, the internal database semantic analysis code refrains from modifying the internal representation of SQL queries to include masking operators. Thus, in one embodiment, a user having the requisite authority can turn on or off all redaction by issuing the appropriate command from any of clients 108A-N.

Example Flow

Figure 2:
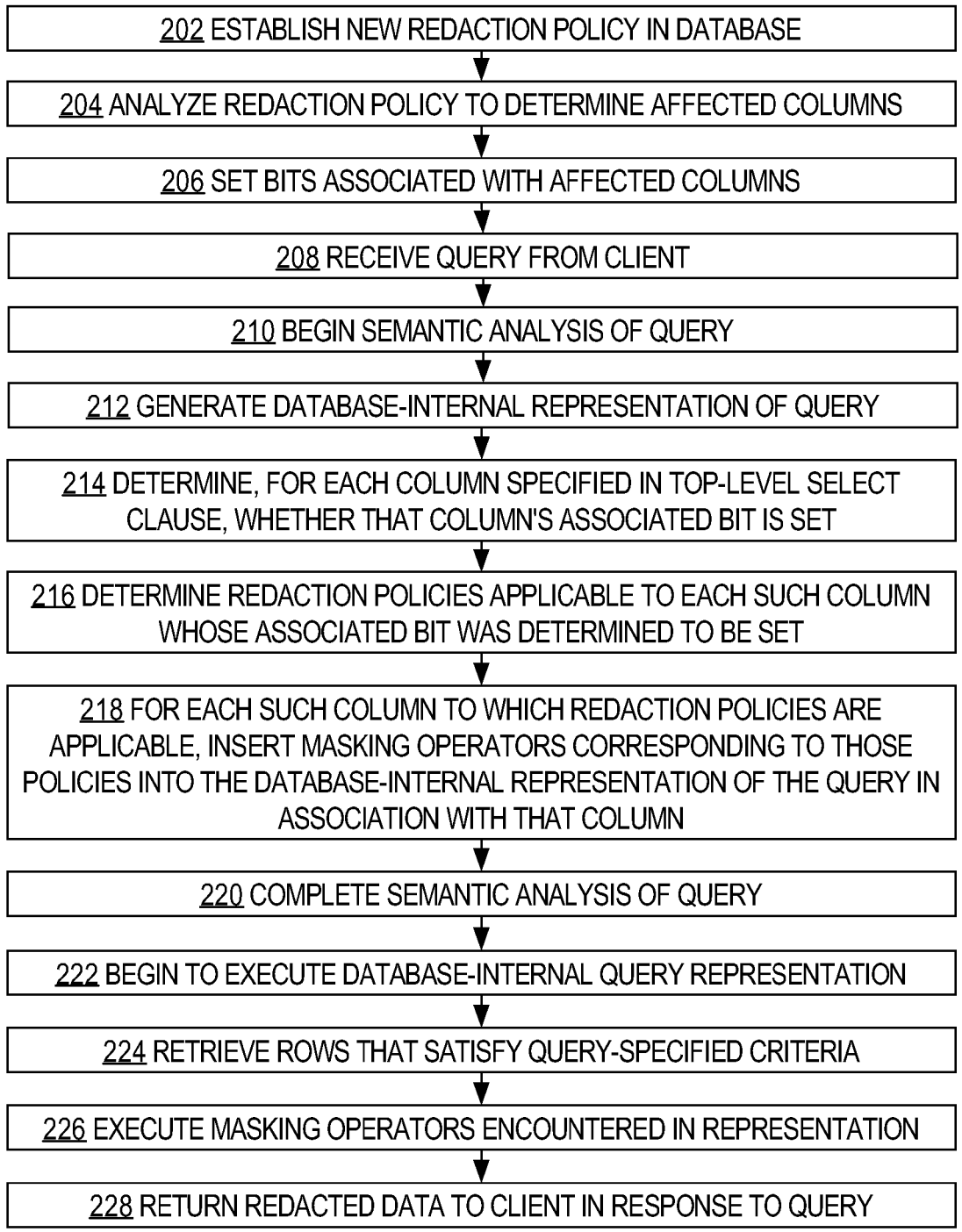
FIG. 2 is flow diagram that illustrates an example technique for performing real-time data redaction, according to an embodiment of the invention.

FIG. 2 is flow diagram that illustrates an example technique for performing real-time data redaction, according to an embodiment of the invention. Alternative embodiments may include additional, fewer, or different steps that those illustrated in connection with FIG. 2.

In block 202, a new redaction policy is established in the database. In block 204, in response to the establishment of the new redaction policy, the redaction policy is analyzed to determine the columns that are potentially affected by the redaction policy. In block 206, for each column that is potentially affected by the redaction policy, a bit associated with that column is set.

In block 208, the database server receives a query from a client. In block 210, the database server begins semantic analysis of the query. In block 212, the database server generates an internal representation of the query. At this point, in one embodiment, the database server may check to see whether redaction has been turned off, and if it has been turned off, then the database server may skip to block 220.

In block 214, for each column specified in the top-level SELECT clause, the database server determines whether that column's associated bit has been set as discussed above with reference to block 206. In block 216, for each such column whose associated bit is set, the database server determines one or more redaction policies that are applicable to that column. In block 218, for each column to which one or more redaction policies are applicable, the database server inserts, into the internal representation of the query and in association with that column, one or more masking operators corresponding to those redaction policies. In block 220, the database server completes semantic analysis of the query.

In block 222, the database server begins to execute the internal representation of the query. In block 224, the database server retrieves, from the database, rows that satisfy query-specified criteria. In block 226, for each such row, and for each column with which one or more masking operators are associated, the database server executes the masking operators relative to the data in that column, thereby redacting the data in that column. In block 228, the database server returns, to the client from which the database server received the query in block 208, the resulting redacted data in response to the query.

Hardware Overview

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. In an embodiment, client-side 102 and/or server-side 110 may reside on a machine such as computer system 300. In an embodiment, database 118 may be a machine such as computer system 300. According to one embodiment of the invention, the techniques described herein are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. The computer-readable medium is just one example of a machine-readable medium, which may carry instructions for implementing any of the methods and/or techniques (e.g., method 500) described herein. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, a RAM, a PROM, an EPROM, a FLASH-EPROM, any other memory chip or cartridge, a carrier wave as described hereinafter, or any other medium from which a computer can read. As disclosed herein, non-transitory media excludes carrier waves and all other media not considered to be within the scope of 35 U.S.C. 101.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method comprising steps of:
   generating an internal representation of a query that references a plurality of columns that includes a particular column;
   determining that said particular column is affected by a redaction policy, wherein said redaction policy specifies a regular expression that applies to said particular column, wherein said regular expression:
   specifies one or more matching criteria for a matching string;
   indicates one or more values to replace with a random value;
   executing the query, wherein executing the query includes:
   for a particular column value in said particular column, determining that a particular string in said particular column value matches said one or more matching criteria;
   in response to determining that a particular string matches said matching criteria, generating a replacement string, wherein generating a replacement string includes, replacing, according to said regular expression, one or more characters in said particular string with a random value;
   returning said replacement string in place of said particular string.

2. The method of claim 1,
   wherein said query includes multiple column instances that each reference said particular column;

for a first column instance of said multiple column instances, determining to place within the internal representation a masking operator corresponding to said first column instance;

for a second column instance of said multiple column instances, determining to not place within the internal representation a masking operator corresponding to said second column instance;

executing the query based on the internal representation, wherein executing the query comprises executing the masking operator to redact data.

3. The method of claim 2, wherein determining to not place within the internal representation a masking operator corresponding to said second column instance includes determining that a join operation involves said second column instance.

4. The method of claim 2, wherein determining to place within the internal representation a masking operator corresponding to said first column instance includes determining that said first column instance is included in a top SELECT clause of said query.

5. The method of claim 1, wherein said particular column stores data of a large object type;

wherein said redaction policy specifies a portion of a large object of said large object type, wherein said portion includes multiple instances of data items;

wherein executing the query includes:

determining that an at least one instance of said multiple instances of data items match said matching criteria;

replacing the at least one instance of said data items that match said matching criteria with different data.

6. One or more non-transitory storage media storing instructions, which when executed by one or more computing devices, cause:

generating an internal representation of a query that references a plurality of columns that includes a particular column;

determining that said particular column is affected by a redaction policy, wherein said redaction policy specifies a regular expression that applies to said particular column, wherein said regular expression:

specifies one or more matching criteria for a matching string;

indicates one or more values to replace with a random value;

executing the query, wherein executing the query includes:

for a particular column value in said particular column, determining that a particular string in said particular column value matches said one or more matching criteria;

in response to determining that a particular string matches said matching criteria, generating a replacement string, wherein generating a replacement string includes, replacing, according to said regular expression, one or more characters in said particular string with a random value;

returning said replacement string in place of said particular string.

7. The one or more non-transitory storage media of claim 6, wherein said query includes multiple column instances that each reference said particular column;

wherein the instructions further including instructions that, when executed by one or more computing devices, cause:

for a first column instance of said multiple column instances, determining to place within the internal representation a masking operator corresponding to said first column instance;

for a second column instance of said multiple column instances, determining to not place within the internal representation a masking operator corresponding to said second column instance;

executing the query based on the internal representation, wherein executing the query comprises executing the masking operator to redact data.

8. The one or more non-transitory storage media of claim 7, wherein determining to not place within the internal representation a masking operator corresponding to said second column instance includes determining that a join operation involves said second column instance.

9. The one or more non-transitory storage media of claim 7, wherein determining to place within the internal representation a masking operator corresponding to said first column instance includes determining that said first column instance is included in a top SELECT clause of said query.

10. The one or more non-transitory storage media of claim 6, wherein said particular column stores data of a large object type;

wherein said redaction policy specifies a portion of a large object of said large object type, wherein said portion includes multiple instances of data items;

wherein executing the query includes:

determining that an at least one instance of said multiple instances of data items match said matching criteria;

replacing the at least one instance of said data items that match said matching criteria with different data.

* * * * *

UNITED STATES PATENT AND TRADEMARK OFFICE
CERTIFICATE OF CORRECTION

PATENT NO. : 9,715,528 B2  
APPLICATION NO. : 14/312578  
DATED : July 25, 2017  
INVENTOR(S) : Ho et al.

Page 1 of 1

It is certified that error appears in the above-identified patent and that said Letters Patent is hereby corrected as shown below:

On the Title Page

On page 2, Column 2, under Other Publications, Line 9, delete "Aciton," and insert -- Action, --, therefor.

In the Specification

In Column 2, Line 58, delete "table" and insert -- table. --, therefor.

Signed and Sealed this  
Twenty-ninth Day of May, 2018

Andrei Iancu  
*Director of the United States Patent and Trademark Office*